NONCONSUMABLE ELECTRODE

Original Filed May 24, 1965 3 Sheets-Sheet 1

NONCONSUMABLE ELECTRODE

Original Filed May 24, 1965 3 Sheets-Sheet 2

United States Patent Office

Re. 27,196
Reissued Oct. 19, 1971

27,196
NONCONSUMABLE ELECTRODE

Serafino M. De Corso, Media, and Charles B. Wolf, Irwin, Pa., assignors to Westinghouse Electric Corporation, Pittsburgh, Pa.

Original No. 3,368,019, dated Feb. 6, 1968, Ser. No. 458,240, May 24, 1965. Application for reissue July 9, 1969, Ser. No. 846,987

Int. Cl. H05b *7/08*

U.S. Cl. 13—18 30 Claims

Matter enclosed in heavy brackets [ ] appears in the original patent but forms no part of this reissue specification; matter printed in italics indicates the additions made by reissue.

*ABSTRACT OF THE DISCLOSURE*

*An electrode has a body or stem portion carrying an electrode head or electrode tip. The body or stem portion is protected by heat shield means external thereto and includes fluid channeling means for conducting a cooling fluid from the upper end thereof toward the electrode head, the fluid channeling means also conducting the fluid after it has performed its cooling function toward the upper end of the body or stem portion. An axially extending passageway open at the upper end thereof, or which may be opened at the upper end, extends through the body or stem portion at least to a position near the electrode head.*

Figure 1A:
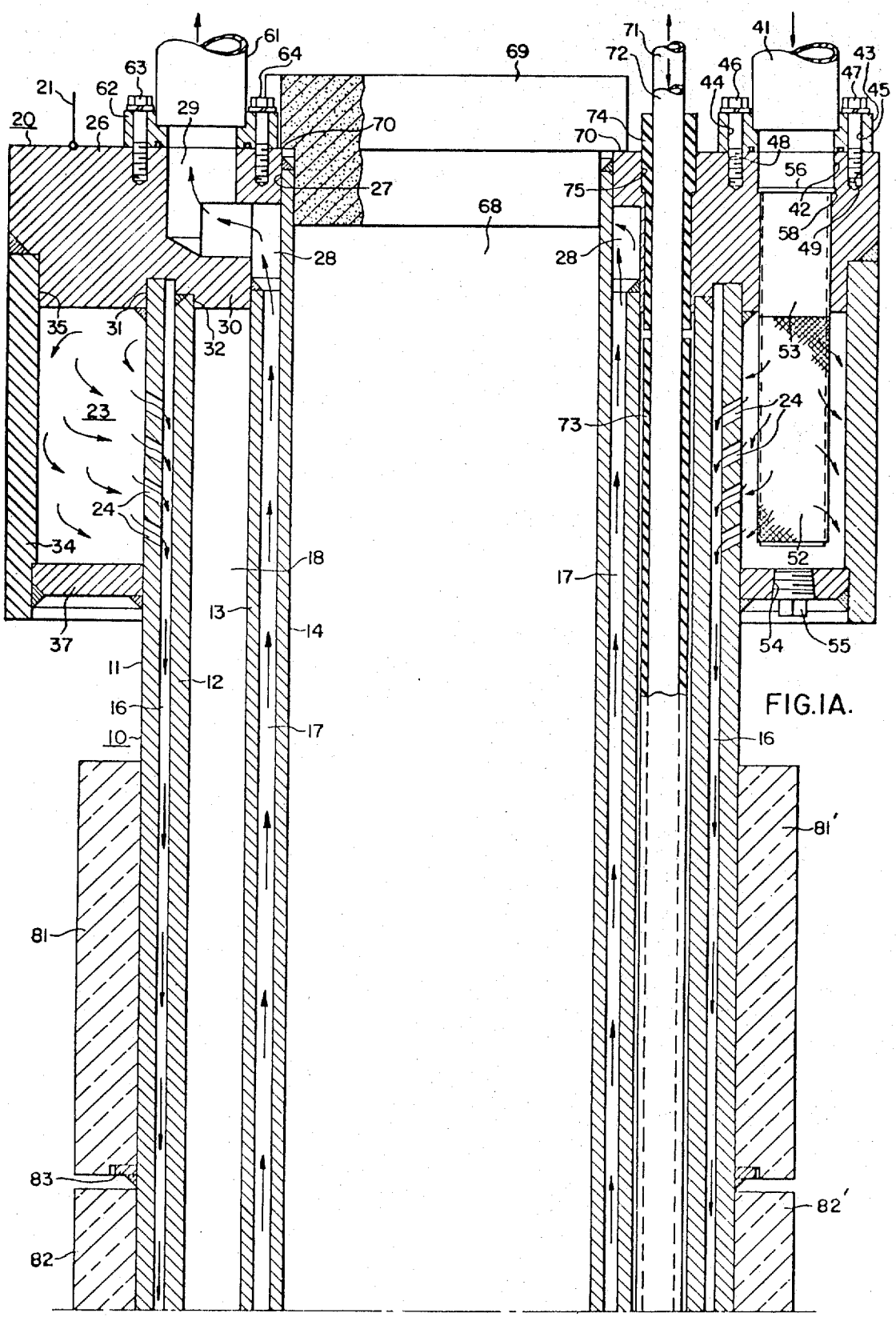

This invention relates to improvements in arc electrodes, and more particularly to an improved non-consumable arc electrode especially suitable for use in a furnace.

Although it is old in the art to employ electric arcs for melting in electric furnaces for metal processing, heretofore it has been the practice to use electrodes composed of graphite or carbon, which electrodes are continuously used up during the melting process, so that in order to maintain the arcing distance between the electrode and the melt within desirable or useful limits, it was necessary to continually readjust the position of the electrode and move it continually in the direction of the melt as the arcing surface was eaten away or consumed by the arc therefrom. Where the electrode of our invention is employed, it is usually necessary to adjust the position of the electrode axially only when there is a change in the level of the melt, or when material is added or removed.

In a copending application of A. M. Bruning for *"Nonconsumable Electrode for Electric Arc Heating and Melting and Methods," Ser. No. 866,274, filed Oct. 14, 1969, now Pat. No. 3,561,029 which application is a continuation-in-part of an application for* "Electric Arc Furnace and Nonconsumable Electrode Suitable for Use Therein," Ser. No. 407,332, filed Oct. 29, 1964, [and] *now abandoned, both* assigned to the assignee of the instant invention, there is described and claimed a substantially nonconsumable electrode in which a water cooled arcing surface is provided, with magnetic field producing means for substantially continually moving the arc around the arcing surface to prevent burn through, and the non-consumable electrode of the Bruning patent application has a useful life order of magnitude greater than the life of a consumable carbon or graphite electrode.

In a copending application of S. M. De Corso and C. B. Wolf for Non-Consumable Arc Electrode, filed Oct. 29, 1964, Ser. No. 407,327, *now issued Patent No. 3,398,229* and assigned to the assignee of the instant application, there is described and claimed a substantially cylindrical hollow electrode with a water cooled arcing surface, the electrode including a plurality of concentric tubes providing passageways for the flow of fluid to and from the electrode face member or arcing surface, and also a space for bringing leads to an arc-moving magnetic field coil disposed in the electrode face member, one or more of the tubes of the last-named copending application carrying electrical current to the arcing surface to produce the arc.

The invention described and claimed herein represents an improvement over, and advance in the art over, the electrodes of the two previously mentioned copending patent applications. In summary, our electrode includes a plurality of concentric tubes forming fluid inlet and fluid outlet passageways between tubes, and also forming a passageway for leads to the field coil located in the electrode face member which is in the form of an annular cap. Our invention is characterized by an improved head structure facilitating the flow of the cooling fluid in various paths and the passage of the various electrical leads, and includes dual plug means for plugging up the central aperture at the top of the electrode and at the arcing end of the electrode. Our invention has improved heat shield means disposed on the outside of the outer annular tube for protecting this tube from the intense heat of radiation and convection from the arc and the melt, and limiting the amount of heat removed from the furnace by the water cooled surfaces of the electrode. Our electrode is characterized by an improved detachable tip described and claimed in the copending application of S. M. De Corso and Charles B. Wolf for "Improved Electrode and Electrode Tip for Use Therein," filed Mar. 17, 1965, Ser. No. 440,425 and assigned to the assignee of the instant invention.

We furthermore provide improved means including an aforementioned gravity maintained plug for enclosing the central aperture of the electrode, both the plug means at the electrode face member, and the plug means at the head or top of the electrode, being removable by sliding out of the remote end of the electrod to permit material introduction and fuse material injection into the furnace through the central opening of the electrode.

Accordingly, a primary object of the invention is to provide a new and improved non-consumable electrode.

A further object of the invention is to provide a new and improved non-consumable electrode especially suitable for use in an electric furnace.

Another object is to provide a new and improved non-consumable electrode having passageway forming means for cooling fluid and having improved heat shield means.

Another object is to provide a new and improved electrode of the type having a central aperture therethrough with improved means for closing the aperture to prevent the escape of heat therethrough, the closure means being removable at will to permit material introduction through the central aperture.

Another object is to provide a new and improved electrode adapted to have a detachable electrode tip and arcing surface forming means secured thereto.

These and other objects will be more clearly apparent after a study of the accompanying drawings in connection with the accompanying specification.

Figure 1B:
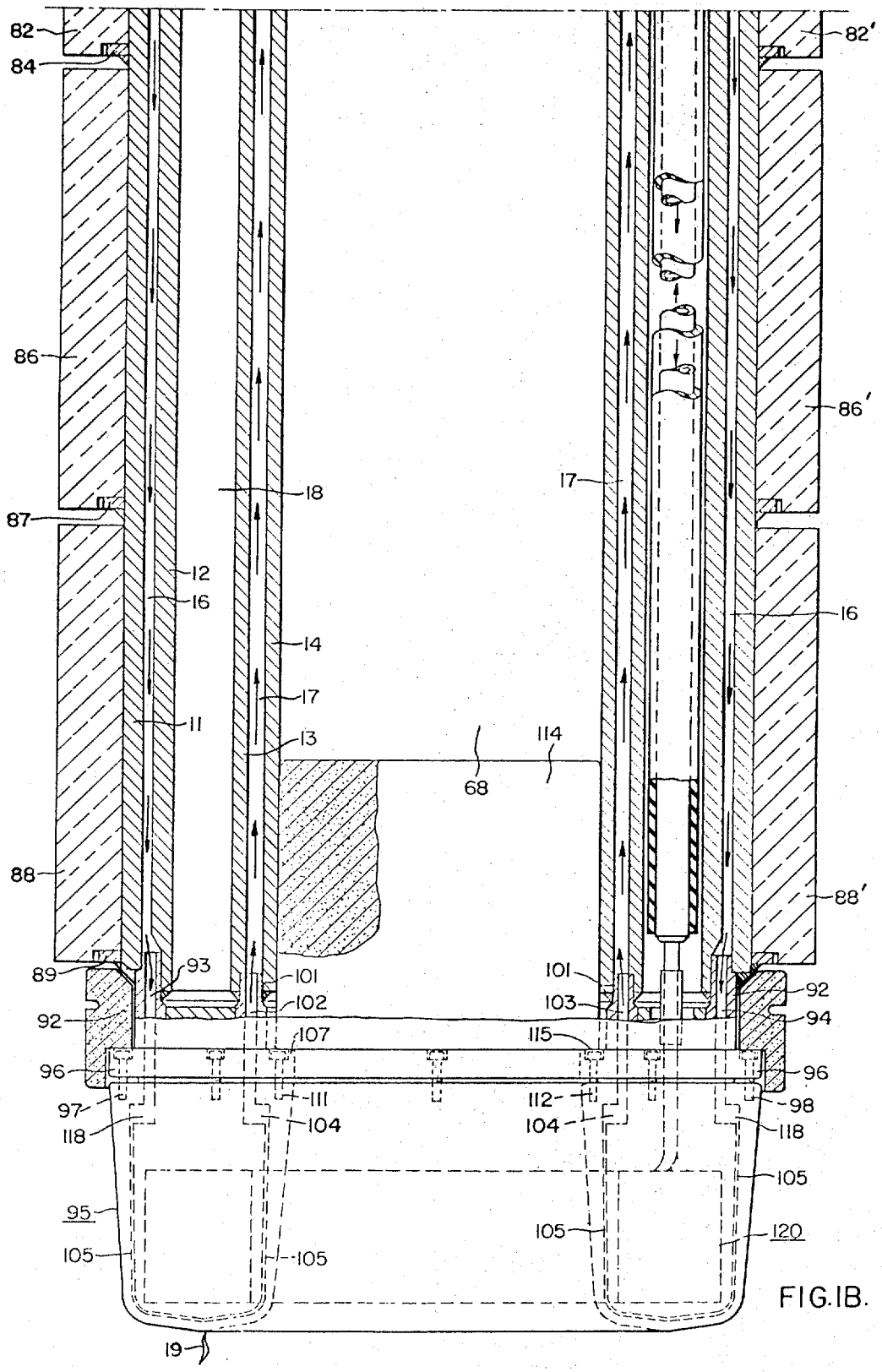
Figure 2:
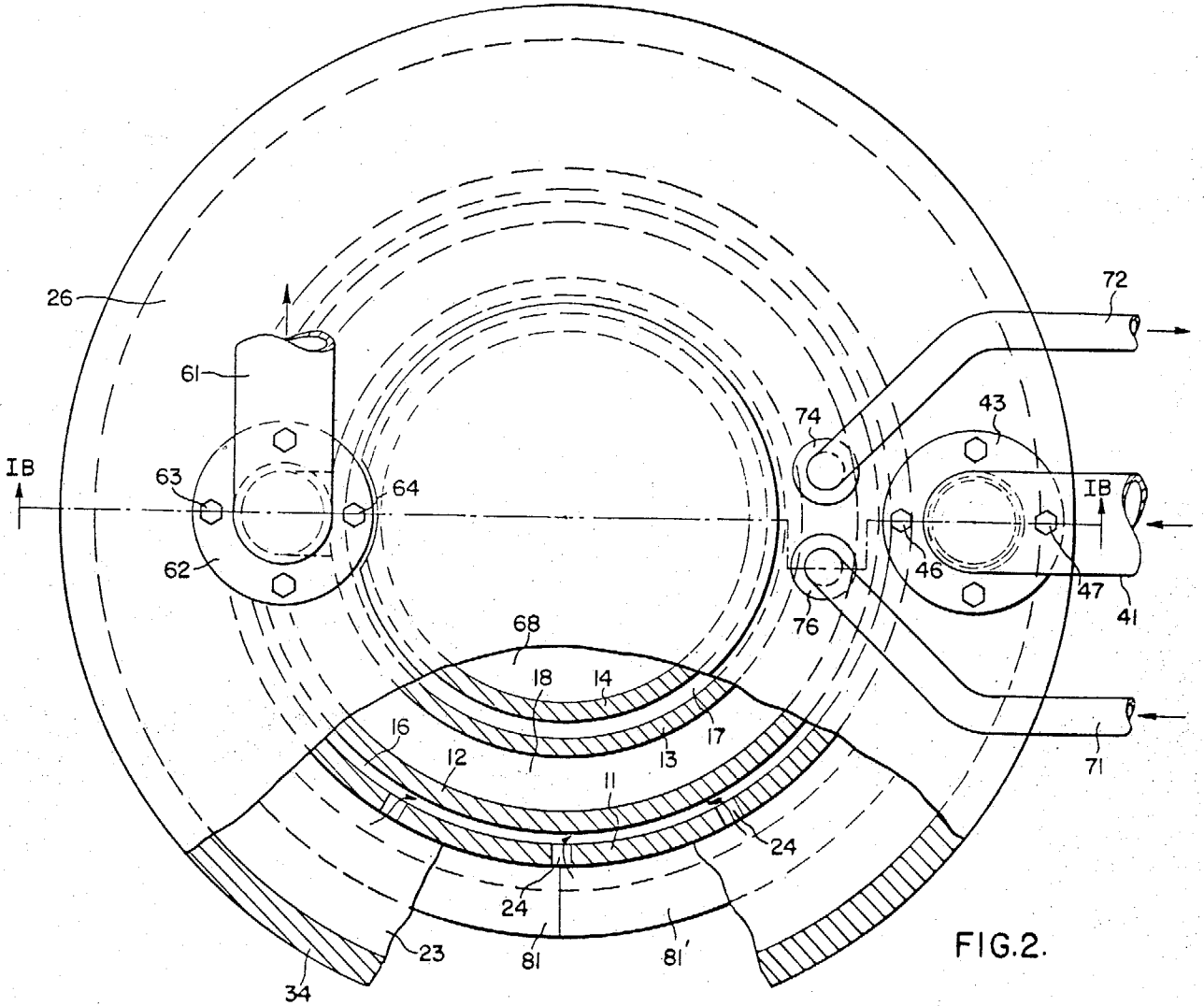
Figure 3:
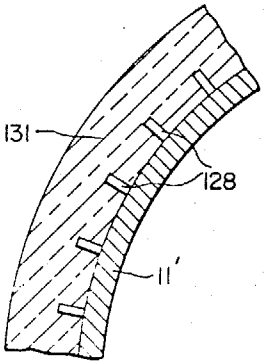

In the drawings:

FIGS. 1A and 1B together constitute a cross-sectional view through the electrode according to the preferred embodiment thereof;

FIG. 2 is a plan view partially cut away of the electrode showing fluid connections and electrical connections thereto; and FIG. 3 is a fragmentary view of a modified heat shield arrangement according to a second embodiment of the invention.

Referring now to the drawings, in which like reference numerals are used throughout to designate like parts for a more detailed understanding of the invention, and in particular to FIG. 1A thereof, there is shown a body ır stem portion of the electrode generally designated 10, nd having four concentric tubes or cylinders 11, 12, .3 and 14 as shown. Cooling fluid is seen to flow down . passageway 16 between the tube 11 and tube 12, these ›eing the two tubes of larger diameter, and fluid flows ıut through the passageway 17 between tubes 13 and .4, these latter two being the two tubes of smaller diam- ter. It is preferred that the cooling fluid enter the elec- rode through the passageway which is nearest to the ube of larger diameter, that is, the outer of the concen- ric tubes. Where the arc 19, FIG. 1B, is produced and ustained by an alternating current of power frequency, or example 60 cycles per sec., because of the skin effect he largest portion of the current is carried by the outer ube 11 although all of the tubes are composed of equal- y conductive material and all have equally good con- ıections with the head member 20 to which the current ource is connected as by means symbolized by lead 21. The larger portion of the alternating current for the arc lowing through tube 11 tends to heat the tube 11 and also ends to heat up the next adjacent inner tube 12. For this eason, the relatively cold water or other cooling fluid hould preferably enter the electrode by the outer pas- ageway 16. This water may have a temperature of 125° F. when it enters the electrode, and may have the tem- ›erature raised to the order of 200° F. after it flows hrough the electrode face member or tip member adja- ent the arcing surface.

The aforementioned or upper head generally desig- ıated 20 includes a cap 26 and an annular fluid input ıeader generally designated 23. The outer tube 11 is een to have a plurality of bores 24 at spaced axial in- ervals along the length thereof near the upper portions, ows of the bores extending around the entire periphery ›f the tube, the bores 24 communicating between pas- ageway 16 and the annular channel of the aforemen- ioned fluid header 23. As will be readily understood, a :onsiderable volume of water must be forced through the :lectrode tip in a short period of time in order to con- luct away from the tip the great heat fluxes generated ›y the intensely hot and high powered arc. For exam- ›le, the arc may have a power of several megawatts, ınd the current involved may run as high as 80,000 am- ›eres or more. Accordingly, water may be supplied to he electrode at, for example, 500 pounds per square nch of pressure.

The upper end cap member 26 has an inner diameter uch that the inner annular edge 27 thereof snugly fits he outer surface of the upper end of the tube 14. The ıead 20 has a fluid header channel 28 therein communi- :ating with a large bore or opening 29 through which luid leaves the electrode. The plug 26 also has a portion 30 of somewhat enlarged inner diameter to snugly fit he outside wall of the tube 13, surfaces 27 and 30 being velded to tubes 14 and 13 respectively, as shown. The ›lug 26 also has cut away portions to form shoulders 31 and 32 for snugly receiving the ends of tubes 11 and 12 respectively, the tubes 11 and 12 being welded to the ›lug 26, as shown. The aforementioned header general- y designated 23 is annular in shape and is formed by a leeve porton 34 snugly and securely mounted against a :houlder formed by a cut-away portion 35 in the outer ırface of plug 26 and is welded therein as shown, and he space between the sleeve 34 and the outer surface of he outer tube 11 is enclosed by an annular ring 37 weld- :d to both the tube 11 and the sleeve 34 by annular velds.

Fluid is brought to bore 42 in the header 23 through he pipe 41, there being a retaining member 43 having ›paced bores around the periphery thereof, two of these ›eing shown at 44 and 45 for receiving bolts 46 and 47 ıaving the threaded ends in threaded bores 48 and 49 ·espectively in the plug or cap 26. Bore 42 passes through he cap and has mounted therein one end of a filter 52.

It is seen in the aforementioned annular ring member 37 there is a threaded bore 54 in which is normally disposed a plug 55, the plug being removable for clean- ing purposes, etc.

The upper end 53 of the aforementioned filter is seen to terminate in a ring 56 which fits against a rather nar- row annular shoulder 58 formed in the aforementioned bore passageway 42, the filter 52 being retained in posi- tion by the force of gravity thereon and the pressure of fluid entering through the pipe 41. Preferably the mesh of the filter 52 is sufficiently small so that any foreign particle passing through the mesh of the filter is small enough to pass through the cooling tubes or passageways in the tip of the electrode as described in detail in the aforementioned copending patent application of Messrs. De Corso and Wolf.

At another position on the plug or cap 26 and pref- erably diametrically opposite to the coupling or retain- ing member 43, there is connected another pipe 61 with retaining member 62 secured to the plug 26 by volts 63 and 64. Pipe 61 opens into aforementioned passage 29 and outlet header 28.

The central passageway 68 is normally closed at the upper or remote end thereof by a plug 69 having a bot- tom portion of reduced diameter forming a shoulder 70 which rests against the adjoining surfaces of the plug 26. Preferably, the plug 69 is composed of a heat re- sistant ceramic or other refractory material.

In the relatively wide annular passageway 18 formed between the tubes 12 and 13, at a predetermined posi- tion therein, there are disposed the leads to an afore- mentioned field coil located in the tip for setting up a magnetic field adjacent the arcing surface of the elec- trode which causes the arc to move substantially con- tinuously around the electrode tip. As explained more fully in the copending patent application of Messrs. De Corso and Wolf, the field coil is wound of hollow cop- per conduit the turns of which are electrically insulated from each other, and a cooling fluid flows through the conduit to conduct heat away from the coil. One of the leads to the coil, shown in dashed line at 120 in FIG. 1B, is provided by conduit 71, FIG. 1A, and the other lead to the coil is provided by conduit 72. Both of these leads are enclosed in electrically insulating material as they pass up through the passageway 18, the insulating sheath for conduit 72 being shown at 73, and it is seen that the upper end of the conduit 72 passes through a bushing 74 composed of insulating material disposed in a bore 75 in the plug or closure member 26.

Particular reference is made now to FIG. 3, a plan view of the upper end of the electrode. In FIG. 3, it is seen that the aforementioned pipes 61 and 41 are bent near the cover member of the electrode to form elbows, and it is also seen that the aforementioned hollow con- duits 71 and 72 are bent in a manner to make a con- venient connection to the electrode. Bushing 76 for lead 71 is also shown.

As will readily be understood by those skilled in the art, recalling that the electrode of the invention is in- tended to be used in an arc furnace, the electrode is subjected to very intense heat of radiation, and also very intense heat of convection of hot gases which may reach thousands of degrees in temperature. To this end, the outer tube 11 is enclosed in a ceramic heat shield formed of axially spaced sections, two of the sections being shown at 81 and 82, FIG. 1A, each of the sections being formed in semicircular parts, the parts 81 and 81' being shown in FIG. 2, the section 81 being supported in position on the outer surface of the electrode by ring 83, FIG. 1A, welded to the surface of the tube. In FIG. 1B, the ceramic section parts 82 and 82' are seen to be supported by ring 84, and additional sections of the ceramic shield are shown at parts 86 and 86' supported by ring 87, and parts 88 and 88' supported by ring 89.

The aforementioned tube 12 is seen to have at the lower extremity thereof a portion of reduced outer diameter to form an annular space for receiving the upper end of an annular ring supporting member 92 *forming part of a lower head* which has a plurality of axially extending bores at spaced intervals around the entire perimeter thereof, two of these axially extending bores being shown at 93 and 94, fluid in the annular passageway 16 passing through the multitude of bores 93 and 94 to the fluid header 118 and thence through the fluid passageways 105 in the electrode tip *or electrode head* generally designated 95. This ring support member 92 is shown in greater detail in the aforementioned copending patent application of Messrs. De Corso and Wolf, Ser. No. 440,425, filed Mar. 17, 1965, entitled "Improved Electrode and Electrod4e Tip for Use Therein, *now issued Patent No. 3,368,018*. It may be noted here that the ring support member 92 has an outwardly extending flange portion 96, around the entire periphery of which there are spaced bores for receiving bolts for retaining the tip 95 to the remainder of the electrode, two of these bolts being shown at 97 and 98.

It is seen that the lower end of the aforementioned tube 13 has at the lower extremity hereof a portion of increased inner diameter to form a space for receiving the upper end of an additional annular supporting ring member 101 *forming a portion of the lower head* having a plurality of axial passageways 102 and 103 at spaced intervals around the entire perimeter thereof, passageways 102 and 103 communicating with an annular water header 104 in the tip generally designated 95, the water header 104 communicating with the fluid passageways 105. Ring support member 101 is shown in greater detail in the aforementioned copending patent application of Messrs. De Corso and Wolf, as are additional details of the water headers 104 and 118, and the passageways 105 in the electrode tip generally designated 95. It is noted, however, that the ring support member 101 has an inwardly extending annular flange portion 107 having axially extending bores therethrough at spaced intervals around the entire flange for receiving additional bolts for retaining the tip 95 to the rest of the electrode structure, two of the bolts being shown at 111 and 112. *Portions 92 and 101 of the lower head are secured rigidly in place with respect to each other as shown.*

Disposed in the aforementioned central opening 68 is a plug 114 preferably composed of ceramic or other very refractory material, the annular edge 115 of the ceramic plug resting against the aforementioned flange 107 and being retained in place by the force of gravity thereon.

The electrode tip is described and claimed in the aforementioned copending patent application as being composed of a highly heat conductive and electrical conductive material such as copper, having a plurality of generally U-shaped passageways around the entire annular arcing surface, water entering the passageways by the header 118 and leaving by the aforementioned header 104. The field coil is shown at 120.

Particular reference is made now to FIG. 3, which shows a ceramic heat shield according to a second embodiment of the invention. In the embodiment of FIG. 3, the outer tube 11' has a plurality of studs 128 extending from the surface thereof, and the ceramic coating is applied to the tube, the ceramic coating being shown at 131 and held in place by clinging to the aforementioned studs.

The structure may be strengthened by providing ribs or struts, not shown for convenience of illustration, connecting adjoining tubes of the group of tubes 11, 12, 13 and 14. Furthermore, a honeycomb structure for pairs of tubes may be employed if desired. Additional ease of construction and strength can be obtained by the use of extruded tubes, if desired of aluminum, at 11, 12, 13 and 14.

As aforementioned, the inside of tube 14 is a central aperture or passageway 68 which provides a corridor for introducing material into the furnace, including fuse material. If desired, means may be attached to the plug 114 for removing the plug by way of the upper end of the passageway 68 without necessitating removal of the electrode from the furnace.

The inside aluminum tube structure can flex relative to the outside providing for a good mating to eccentricities.

The tubes may be coated to increase their electrical conductivity if desired.

The construction of the electrode permits the use of high pressure water or other cooling fluid, increasing the rate of flow and increasing the heat flux which may be removed by the water. Furthermore, the apparatus is admirably suited for high fluid velocity. This provides maximum cooling capability, and the pressure drop in the cooling fluid may be from, for example, 500 p.s.i. in cylindrical inlet passageway 16 to, for example, 100 p.s.i. in the outlet passageway 17.

If desired, tubes 13 and 14 may be welded or [outerwise] *otherwise* secured together and made removable as a unit from the other tubes, a suitable head corresponding to head 20 being provided.

Whereas we have shown and described our invention with respect to some embodiments thereof which give satisfactory results, it should be understood that changes may be made and equivalents substituted without departing from the spirit and scope of the invention.

We claim as our invention:

1. In an electrode for use in an arc furnace, in combination, an annular electrode tip composed of non-magnetic material having good electrical and thermal conductivity and providing an arcing surface, the electrode tip having a plurality of generally U-shaped passageways therein for the flow of a cooling fluid near the arcing surface, an electrode body portion comprising a plurality of concentric tubes and having the tip mounted at one end thereof, at least one of the tubes being composed of electrically conductive material for bringing electrical current to produce and sustain an arc from the tip, the tubes being of graduated diameters and spaced from each other to form a plurality of cylindrical passageways therebetween, one cylindrical passageway between the outer tube and the next adjacent tube bringing a cooling fluid to the electrode tip, another cylindrical passageway conducting fluid from the electrode tip, a magnetic field producing coil disposed in the electrode tip, means passing through the electrode body portion for bringing an energizing potential to the magnetic field producing coil, inlet fluid header means and outlet fluid header means disposed at the other end of the electrode body portion, the inlet fluid header means including means forming an annular chamber encircling the outer tube at said other end of the electrode body portion, said outer tube having a plurality of axially spaced and circumferentially spaced bores therethrough around the entire tube adjacent the inlet fluid header means forming fluid passageways between the annular chamber and said one cylindrical passageway, the inlet and outlet fluid header means being adapted to have fluid conduit means connected thereto, and heat shield means disposed around the outside of the tube of largest diameter for protecting said last-named tube from heat of convection and radiation from the arc and for limiting the amount of heat removed from the furnace by the fluid cooled surfaces of the electrode.

2. An electrode according to claim 1 additionally characterized in that the tube of smallest diameter forms a central opening extending substantially the entire length of the electrode body portion, the central opening of the annular tip having a diameter substantially equal to that of the tube of smallest diameter whereby a corridor is formed for feeding material into the furnace through the electrode, and including in addition removable means for plugging up the corridor of the electrode at the annular tip end of the electrode, and other removable means for plugging up the corridor of the electrode at the other end of the electrode.

3. Electrode apparatus comprising, in combination, an electrode body portion including a plurality of concentric ubes of graduated diameters, the tubes being spaced from each other to form a plurality of cylindrical passageways herebetween, a generally annular cup member mounted at one end of the body portion composed of a highly heat conductive material and having an inner cylindrical wall portion, an outer cylindrical wall portion, and a bottom wall portion forming an arcing surface, a plurality of generally U-shaped tubes disposed within the annular cup member extending axially along both cylindrical wall portions and across the bottom wall portion of the annular cup member, the U-shaped tubes being disposed at spaced intervals around the entire periphery of the annular cup member, a field coil disposed in the annular cup member for setting up a magnetic field adjacent the arcing surface of the annular cup member to substantially continuously move the arc in an annular path around the annular cup member, one of said cylindrical passageways conducting fluid to the plurality of generally U-shaped tubes in the annular cup member, another of said cylindrical passageways conducting fluid from the plurality of generally U-shaped tubes in the annular cup member, an additional cylindrical passageway containing lead means for the field coil, fluid inlet header and fluid outlet header means at the other end of the electrode body portions, the fluid inlet header means including means forming an annular chamber encircling the outer tube of said plurality of concentric tubes and having a plurality of axially spaced and circumferentially spaced bores forming fluid passageways between the annular chamber and said one cylindrical passageway, means at the annular cup member for closing the tube of smallest diameter, and means for closing the tube of smallest diameter at the other end of the electrode body portion.

4. Electrode apparatus according to claim 3 including in addition heat shield means composed of refractory material substantially enclosing the outer of said plurality of concentric tubes along the entire length thereof, the heat shield means including axially spaced sections each supported by an annular ring secured to the outer of the concentric tubes, each section including two semi-cylindrical portions.

5. A non-consumable are electrode comprising, in combination, electrode face means composed of nonmagnetic, conductive material and providing an arcing surface, magnetic field producing means disposed near the arcing surface of the electrode face means, the electrode face means being annular in shape and having a plurality of generally U-shaped passageways therein, the U-shaped passageways being at spaced intervals around the periphery of the electrode face means and providing means for the flow of a cooling fluid near the arcing surface, a tubular structure composed at least partially of conductive material supporting the magnetic field producing means and the electrode face means and making electrical connection with the electrode face means, the tubular structure including means providing a plurality of passageways including at least one annular passageway for the flow of a cooling fluid to the passageways in the electrode face means and at least another annular passageway for conducting fluid from the passageways in the electrode face means, the conductive portion of the tubular structure being adapted to have a source of electrical potential connected thereto for producing an arc from the arcing surface of the electrode face means, the magnetic field causing the arc to move substantially continuously over said arcing surface, and thermally insulating means disposed around the outside of at least a portion of the tubular structure adjacent the electrode face means, the thermally insulating means including axially spaced sections of refractory material, each axially spaced section including two semi-cylindrical portions.

6. A non-consumable arc electrode according to claim 5 including in addition, water header means disposed at the end of the electrode away from the electrode face means, the water header means including means forming an annular chamber encircling the tubular structure and communicating with said one annular passageway.

7. A non-consumable electrode according to claim 5 in which the electrode is additionally characterized as having a large central passageway therethrough and as having means at the electrode face means forming a first annular shoulder and means at the other end of the electrode forming a second annular shoulder, and including in addition removable plug means composed of refractory material closing the central aperture at the end of the electrode adjacent the electrode face means and normally supported by said first annular shoulder, and other removable plug means composed of refractory material closing the central aperture at the other end of the electrode and normally supported by said second annular shoulder.

8. A non-consumable arc electrode comprising, in combination, a tubular structure including a first sleeve and forming a first passageway, a second sleeve disposed around the first sleeve coaxially therewith, at least one of the first and second sleeves being composed of conductive material, the second sleeve being of greater diameter and forming an additional passageway between the second sleeve and the first sleeve, electrode head means at one end of the tubular structure including fluid inlet means and fluid outlet means communicating selectively with the first passageway and the additional passageway between the first sleeve and the second sleeve, the fluid inlet means including header means in the shape of an annular chamber encircling the tubular structure, filter means in the header means, fluid cooled annular electrode face means mounted at the other end of the tubular structure and providing an arcing surface, the fluid cooled annular electrode face means including an annular tip having a plurality of generally U-shaped passageways therein near the arcing surface, the U-shaped passageways of the annular electrode face means being operably connected to the fluid inlet means and fluid outlet means by way of the first passageway and the additional passageway, a field coil supported by the tubular structure near the arcing surface of the electrode face means, means including the sleeve of conductive material forming an electrical circuit between the electrode face means and the electrode head means, and means connected to the field coil for energizing the coil to set up a magnetic field at the arcing surface of the electrode face means.

9. A non-consumable arc electrode comprising, in combination, a tubular structure including fluid inlet and fluid outlet means, sleeve means forming a fluid inlet passageway extending axially of the tubular structure and other coaxially disposed sleeve means forming a fluid outlet passageway, an annular electrode face member composed of conductive, non-magnetic material, the electrode face member including an annular tip, the annular tip having a plurality of generally U-shaped passageways therein, each of the U-shaped passageways passing near the arcing surface of the annular tip, the U-shaped passageways being disposed at closely spaced intervals around the entire periphery of the tip, cylindrical fluid channeling means extending between one of said fluid passageways and the corresponding ends of all of the plurality of U-shaped passageways, other cylindrical fluid channeling means extending between the other of the fluid passageways and the other ends of all of the U-shaped passageways, coil means disposed within the annular tip, lead means for bringing an electrical current to the coil means to set up a magnetic field at the arcing surface of the electrode tip, means for applying an electrical potential to the electrode tip to form an arc therefrom, the magnetic field causing the arc from the electrode tip to move substantially continuously in a substantially circular path about the annular arcing surface of the electrode tip, said circular path cutting across substantially all of the U-shaped passageways, and heat shield means composed of highly heat resistive material disposed around the outside of at least a portion of the tubular structure adjacent the electrode face member, the heat shield means including axially spaced sections each supported by an annular ring secured to the tubular structure, each section including two semi-cylindrical portions.

10. A non-consumable arc electrode for use in an electric furnace comprising, in combination, annular electrode face means composed of non-magnetic, conductive material providing an arcing surface, magnetic field producing means disposed in the electrode face means, the electrode face means having a plurality of generally U-shaped passageways therein, each of the U-shaped passageways passing near the arcing surface, the U-shaped passageways being at closely spaced intervals around the entire periphery of the annular electrode face means, a tubular structure composed at least partially of conductive material supporting the magnetic field producing means and the electrode face means and making electrical connection with the electrode face means, and heat shield means external to at least a portion of the tubular structure, the heat shield means including a plurality of axially spaced sections each supported by and attached to a plurality of studs extending from the outer surface of the tubular structure, the tubular structure having a large central aperture and including means providing concentric passageways for the flow of a cooling fluid to the passageways in the electrode face means and conducting fluid from the passageways in the electrode face means, the conductive portion of the tubular structure being adapted to have a source of electrical potential connected thereto for producing an arc from the arcing surface of the electrode face means, the magnetic field causing the arc to move substantially continuously over said arcing surface.

11. An electrode according to claim 10 including in addition removable plug means composed of a highly heat resistant material mounted in the annular electrode face means and reducing the amount of heat which reaches the interior of the tubular structure from the furnace, and other removable plug means composed of a highly heat resistant material mounted in the central aperture at the other end of the electrode, the removable plug means and other removable plug means being removed to permit the introduction of material into the furnace through the central aperture of the electrode and being thereafter replaced.

12. In a non-consumable electrode, in combination, inner and outer concentric means forming first and second channels respectively for the flow of cooling fluid and providing a central aperture extending axially through the electrode, first annular fluid channeling and supporting means secured at one end thereof, second annular fluid channeling and supporting means secured at said last-named end thereof, annular electrode face means mounted on the first and second fluid channeling and supporting means, the annular electrode face means including an annular tip forming an arching surface, said annular tip having a plurality of generally U-shaped passageways therein, each of said passageways passing near the arcing surface of the tip, said passageways being located at closely spaced intervals around the entire periphery of the tip and providing for the flow of a cooling fluid near the arching surface, magnetic field producing means disposed within the electrode face means and having lead means for bringing an energizing potential thereto, and first and second plug members composed of a highly heat resistive material disposed in the central aperture of the electrode at both ends thereof and closing the central aperture against the passage of heat flux therethrough.

13. An electrode according to claim 12 including in addition fluid inlet header means and fluid outlet header means disposed at the end of the electrode away from the annular electrode face means, the fluid inlet header means including means forming an annular chamber encircling the outer concentric means and having a plurality of axially spaced and circumferentially spaced bores communicating with the second channel formed by the outer concentric means.

14. In a non-consumable electrode, in combination, an annular electrode face member adapted to be fluid cooled, the electrode face member including an annular tip having a plurality of generally U-shaped passageways therein, each of the U-shaped passageways passing near the arcing surface of the annular electrode face member, a field coil disposed within the tip, means including cylindrical fluid channeling means for bringing a cooling fluid to the electrode face member, means including other cylindrical fluid channeling means for conducting fluid from the electrode face member, fluid inlet header means and fluid outlet header means communicating with the fluid channeling means and the other fluid channeling means respectively, the fluid inlet header means including means forming an annular chamber encircling the electrode and having a plurality of fluid passageways for conducting fluid therefrom, fluid filter means in the annular chamber, and plug means including at least one removable plug composed of a highly heat resistant material mounted in the central aperture of the electrode and preventing the passage of heat flux therethrough.

15. An electrode comprising, in combination, a tip composed of non-magnetic, highly heat conductive material, the tip being generally in the shape of an annular cup forming an arcing surface, the electrode tip having a plurality of spaced generally U-shaped passageways extending around the entire periphery of the cup, the electrode tip having a field coil disposed therein for setting up a magnetic field at the arching surface of the tip, an electrode body portion supporting the tip at one end of the body portion, the electrode body portion including a plurality of concentric tubes of graduated diameters, at least one of said tubes being composed of electrically conductive material, and fluid inlet means and fluid outlet means at the other end of the electrode body portion, the spaces between the concentric tubes conducting fluid from the fluid inlet means to the electrode tip and conducting fluid from the electrode tip to the fluid outlet means, the fluid inlet means including means forming an annular chamber encircling the electrode body portion and having a plurality of axially spaced and circumferentially spaced fluid passageways in the inner wall thereof.

16. An electrode according to claim 15 including in addition two removable plug means for closing the ends of the electrode, each of the plug means being composed of refractory material.

*17. An electrode for electric are furnaces comprising an upper head, a lower head of conductive material, a conductive metal structure connecting said heads, an electrode head carried by said lower head, and a ceramic covering enclosing said metallic structure.*

*18. In an electrode as claimed in claim 17, said metallic structure including conducting means for a cooling medium.*

*19. In an electrode as claimed in claim 17, said upper and lower heads being hollow and said metallic structure comprising tubes connecting said upper and lower heads.*

*20. In an electrode as claimed in claim 17, said upper head, metallic structure and ceramic covering having a central longitudinal hole therein.*

*21. In an electrode as claimed in claim 20, said electrode head having a hole therein communicating with said longitudinal hole.*

*22. An electrode for electric arc furnaces comprising an upper head, two radially spaced annular ring supporting members composed of conductive material near the lower end of the electrode, a conductive metal structure connecting the upper head and the two radially spaced annular ring supporting members, an electrode tip carried by said two radially spaced annular ring supporting members, and a ceramic covering enclosing said metallic structure.*

*23. In an electrode as claimed in claim 22, said metallic structure including conducting means for a cooling medium.*

*24. In an electrode as claimed in claim 22, said upper head being hollow and said two radially spaced annular ring supporting members each having a plurality of axially extending passageways therethrough at spaced intervals around the entire periphery thereof, and said metallic structure comprising tubes connecting said upper head and said two radially spaced annular ring supporting members.*

*25. In an electrode as claimed in claim 22, said upper head, metallic structure and ceramic covering having a central longitudinal hole therein.*

*26. In an electrode as claimed in claim 25, said electrode tip having a hole therein communicating with said longitudinal hole.*

*27. An electrode comprising a body or stem portion at least partially composed of conductive material, an electrode head composed of conductive material carried by the stem portion at the lower end thereof, and heat shield means external to the stem portion, the stem portion and electrode head having mutually communicating axially extending passageways therethrough whereby an axial opening extends from the top of the steam portion the length of the electrode.*

*28. An electrode according to claim 27 wherein the stem portion includes fluid channeling means for conducting a cooling fluid from the upper end thereof toward the electrode head, the fluid channeling means also conducting fluid after it has performed its cooling function toward the upper end of the stem portion.*

*29. An electrode according to claim 27 in which said stem portion includes a plurality of concentrically mounted tubes radially spaced from each other.*

*30. An electrode comprising a body or stem portion, an electrode head carried by the stem portion at the lower end thereof and heat shield means external to the stem portion, the stem portion including fluid channeling means for conducting a cooling fluid from the upper end thereof toward the electrode head, the fluid channeling means also conducting fluid after it has performed its cooling function toward the upper end of the stem portion, the stem portion and electrode head having mutually communicating axial passageways therethrough whereby an axial passageway extends from the top of the stem portion the length of the electrode.*

References Cited

The following references, cited by the Examiner, are of record in the patented file of this patent or the original patent.

UNITED STATES PATENTS

| | | | |
|---|---|---|---|
| 2,093,821 | 9/1937 | Southgate | 239—288.5 |
| 2,472,851 | 6/1949 | Landis | 315—347 |
| 3,130,292 | 4/1964 | Gage et al. | 219—75 |
| 3,307,011 | 2/1967 | Baird | 219—74 |

BERNARD A. GILHEANY, Primary Examiner

R. N. ENVALL, Jr., Assistant Examiner